Nov. 14, 1939.   V. SANTARELLI ET AL   2,179,580
DUSTER
Filed Feb. 14, 1938   2 Sheets-Sheet 1

INVENTOR.
VINCENT SANTARELLI
AND JOHN GIACOBBE
BY
ATTORNEY.

Nov. 14, 1939.  V. SANTARELLI ET AL  2,179,580
DUSTER
Filed Feb. 14, 1938   2 Sheets-Sheet 2
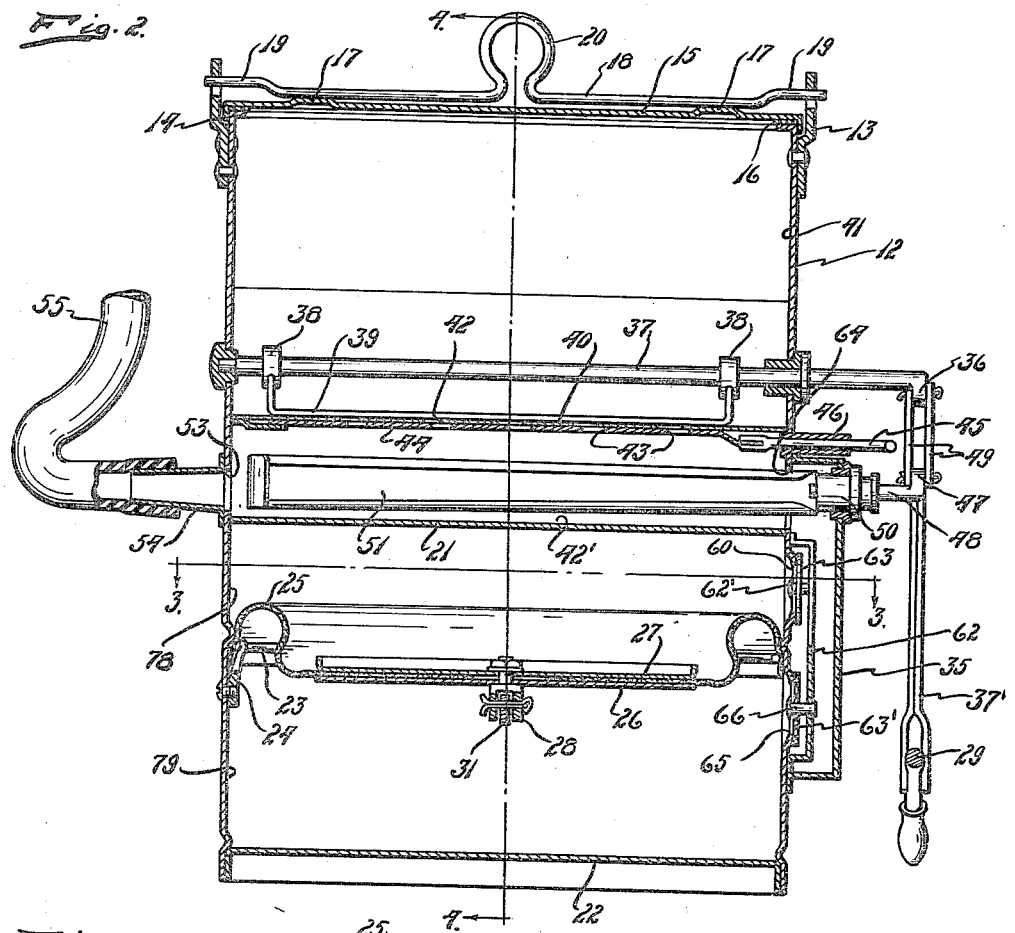
Fig. 2.
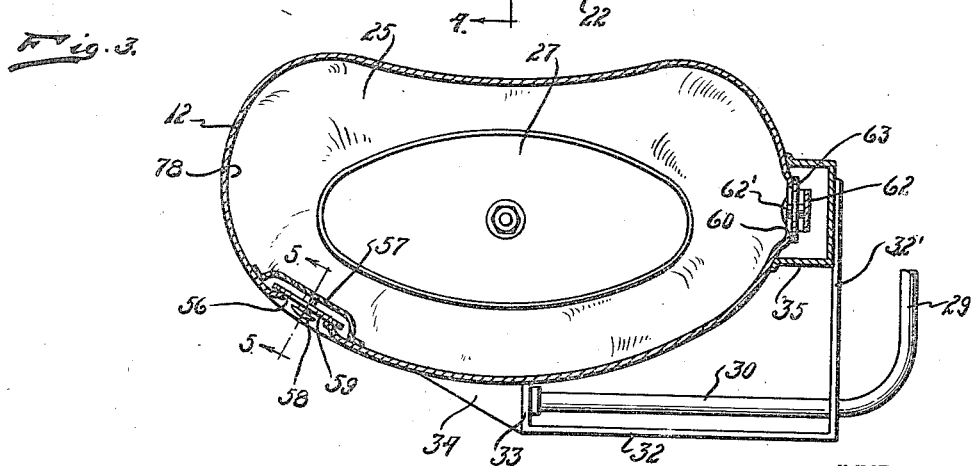
Fig. 3.
INVENTOR.
VINCENT SANTARELLI
AND JOHN GIACOBBE
BY
ATTORNEY Patented Nov. 14, 1939

2,179,580

UNITED STATES PATENT OFFICE 2,179,580

DUSTER

Vincent Santarelli and John Giacobbe, Detroit, Mich.

Application February 14, 1938, Serial No. 190,430

4 Claims. (Cl. 43—147)

Our invention relates to a new and useful improvement in a duster adapted for ejecting a spray of dust and particularly intended for use in spraying plants and the like with powder for protecting the same from injurious insects.

The dusters of this type are generally of a class where the powder is ejected in a dust-like spray by means of spaced puffs. This ejection of the powder in puffs is undesirable in that it delays the operation and prevents a uniform distribution of the powder over the plants intended to be dusted.

It is an object of the present invention to provide a duster of this class so arranged and constructed that the powder may be ejected from the apparatus in a steady stream thus eliminating the periodic cessations where the puffing system is used.

Another object of the invention is the provision of a blast-producing mechanism of the bellows type so arranged and constructed that a constant air pressure will be directed through the outlet spout.

Another object of the invention is the provision of a construction whereby a pair of compartments separated by a bellows and so arranged and constructed that upon one movement of the bellows, air is flowing into one compartment while it is being ejected from the other and vice versa.

Another object of the invention is the provision in a duster of this class of means for agitating the powder and maintaining it in a state of agitation while subjecting it to a constant blast of air.

Another object of the invention is the provision of means for regulating the amount of powder which is ejected from the mechanism.

Another object is the provision of a device of this class which will be simple in structure, economical of manufacture, durable and highly efficient in use.

Other objects of the invention will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention.

Fig. 2 is a vertical, central, sectional view of the invention.

Fig. 3 is a sectional view taken on line 3—3 of Fig. 2.

Fig. 4 is a sectional view taken on line 4—4 of Fig. 2.

Fig. 5 is a fragmentary, sectional view illustrating the inlet valves used in the invention.

Fig. 6 is a fragmentary, central, sectional view showing a slightly modified form of the invention.

Fig. 7 is a fragmentary, sectional view taken on line 7—7 of Fig. 6.

Figure 1:
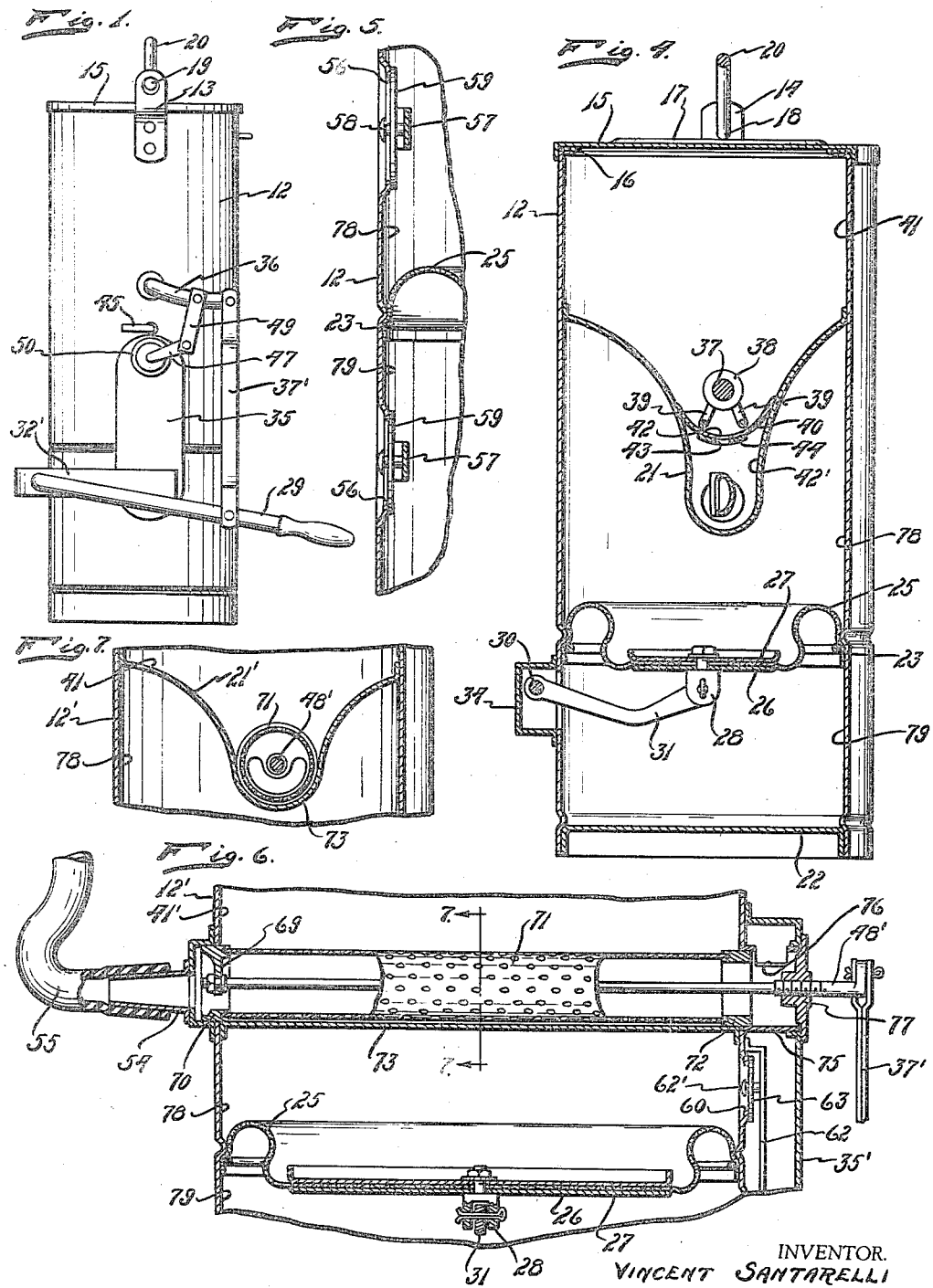

In the drawings we have illustrated the invention as comprising a tank 12 projecting upwardly from the upper end of which at diametrically opposite sides are the lugs 13 and 14. A cover 15 is adapted to rest upon the upper open end of the tank or container and bear upon a gasket 16. Bosses 17 are pressed upwardly from the cover 15. A securing rod 18 having the upwardly offset ends 19 projected through openings formed in the lugs 13 and 14 and having a central gripping portion or hand hold 20 is provided for securing a cover tightly in position, a rocking of this rod 18 until the hand hold 20 rests upon the cover 15 serving, through the cam action of the offset portions 19, to press the cover tightly against the gasket 16.

A partition 21 is spaced from the bottom 22 to provide an air chamber. A rod 23, held in position by the clips 24, serves to engage the edge portion of a flexible flap 25 which serves as a bellows, the central portion of which is reinforced by the rigid metallic plates 26 and 27. As this flap is rocked upwardly toward the partition 21, the air chamber below the flap is, of course, enlarged and as the flap is rocked downwardly toward the bottom 22, the air chamber above the flap is enlarged.

Secured to the plates 26 and 27 and projecting downwardly therefrom are the spaced lugs 28 between which is pivotally mounted one end of a rocker arm 31, the other end of which is fixedly mounted on the rockable rod 30 which is an angularly turned portion of the handle 29. This angularly turned portion extends through the angularly turned portion 32' of the strap 32 and also through the angularly turned portion 33 of this strap. This angularly turned portion 33 abuts against and is welded or otherwise secured to a housing 34, the arm 31 leading off from the housing 34 as shown in Fig. 4. The construction is such that by rocking the rod 30, the arm 31 may be rocked to move the bellows upwardly and downwardly.

Mounted on the side of the container or tank 12 is an elongated housing 35. The arm 29 is pivotally connected to one end of the bar 37', the opposite end of which connects to the crank 36 which is angularly turned on one end of the shaft 37, this shaft 37 projecting through the container as shown in Fig. 2. Pivotally mounted on the shaft 37 within the compartment 41 above the partition 40 are collars 38 carrying the agitating blades or rods 39. As shown in Fig. 4 the partition or bottom 40 serves to separate the trough 42' from the campartment 41. Formed in the arcuate partition or bottom 40 are openings 42 which are adapted to register with openings 43 formed in the slidable blade 44 which is connected to the rod 45 projected outwardly through the bearing 46 so that the quantity of powder deposited in the compartment 41 which is permitted to fall into the trough 42' may be regulated.

Links 49 serve to connect the angularly turned end or crank 47 on the shaft 48 to the crank 36 on the shaft 37. This crank 48 is rotatably projected through the bearing 50 mounted on the wall of the housing 35, and mounted on and projecting inwardly from the inner end of the shaft 48 is an agitating blade 51 which serves to agitate the powder deposited in the trough 42'. An opening 53 is formed in the side of the container 12 communicating with the trough 42' and positioned over this opening and projecting outwardly from the periphery or outer surface of the container 12 is a nozzle 54 on which is fixed one end of a flexible conduit 55.

Mounted on the side of the container 12 so as to establish communication of the compartment 79 positioned between the partition 21 and the bellows flap 25 with the exterior and also so as to communicate the interior of the compartment 79 with the exterior is an air inlet valve. Each of these valves is constructed similarly so that a description of one will suffice for both. An opening 56 is formed in the side of the container 12 to communicate with the compartment 78. Mounted on the side of the container spaced from this opening is a bracket 57 projecting outwardly from which is a stud 58 carrying a valve flap 59. The construction is such that upon the inward pressure being greater than the pressure within the compartment 78, air will be admitted to the compartment 78. The same is true as to the compartment 79. Upon the pressure within the compartment being greater than the atmospheric pressure without, the valve 59 will close the opening 56 and prevent escape of air from the compartment.

Formed in the side of the container in the compartments 78 and 79 are openings 60 and 65 respectively, communicating with the housing 35 mounted on the container. Secured to the exterior of the container 12 and bent to extend parallel thereto over the openings 60 is a supporting plate 62 which carries studs 62' and 66. Mounted on the stud 62' is a valve 63 adapted for closing the opening 60 when the pressure exterior of the compartment 78 is greater than the pressure within and opening when the pressure within is greater than the pressure without. An opening 65 is formed in the container 12 communicating with the compartment 78 to establish communication thereof with the interior of the housing 35. Similarly mounted on the stud 66 is a valve 63 adapted for closing the opening 65. When the pressure within the compartment 79 is greater than the pressure without, the valve 63 will open and permit the air to enter the housing 35. This housing 35 through an opening 64 communicates with the trough 42'.

The construction is such that as the bellows 25 is moved upwardly and downwardly through a rocking of the arm 31, the air will be forced through the opening 60 into the housing 35 passing from this housing through the opening 64 into the trough 42'. Upon the downward movement, the air inlet valve will, of course, be closed. Upon the reverse movement the valve 63 wil be closed and the air inlet valve will open. Upon the reverse movement the air within the compartment 79 will be forced otwardly through the opening 60 into the housing 35, the air inlet valve for the compartment 78 in this movement being closed. Upon the reverse movement of the bellows flap 25, the air inlet valve will be open and the valve 63 will move into closed position. Thus, upon each movement of the bellows flap 25, air will be forced into the trough 42' and outwardly through the conduit 55. As the handle 29 is rocked to effect the operation of the bellows flap, the shaft 48 will also be rocked to agitate the powder in the trough 42' and the shaft 37 will also be rocked to agitate the powder which would be resting upon the partition or bottom 40 so that a constant deposit of the powder in the trough 42' would be assured and an agitation of the powder within the trough effected. Consequently, the powder will be blown outwardly of the trough through the nozzle 54 into the conduit 55 which the operator will direct to the proper location for depositing the powder upon the object which it is desired to spray. The powder will, of course, be ejected from the conduit 55 in a steady stream. It is thus believed obvious that we have provided a simple and effective means for spraying powder in dust-like form from a conduit in a steady stream with a mechanism of the bellows type. It is also believed that the device is obviously economical of manufacture, that it is durable while at the same time compact and easily operated.

In Fig. 6, we have shown a somewhat modified form of construction in which the partition 40 shown in Fig. 4 is eliminated as is likewise the shaft 37. In this form the shaft 48' corresponds to the shaft 48 and differs therefrom in that it is extended across the partition and journalled on the bearings 69 which is formed integral with the annulus 70 fixedly mounted on the perforated cylinder 71 which carries an annulus 72 at its opposite end, this annulus being positioned above the arcuate portion 73 of the partition 21' corresponding to the partition 21. The cylinder 71 serves as a crusher and rolls the powder under it to crush it, the crushed powder entering the cylinder 71 through the openings formed therein and the interior of this cylinder communicates with the interior of the housing 35' corresponding to the housing 35. This cylinder also communicates with the nozzle 54 to which one end of the conduit 55 is attached. The advantages of the preferred form of the construction are also present in the modified form and the additional feature of having a crushing or grinding action is also present.

It will be noted, that the rod 48' is threaded through the bearing plate 77 so that as the rod 48' is locked, the cylinder 71 will also move axially. This cylinder 71 serves the function of the trough 42' and may be itself termed a trough. An opening 76 is provided communicating with the interior of the housing 35' whereby air may enter the cylinder 71 and pass therethrough to the outlet nozzle 54.

While we have illustrated and described the preferred form of construction, we do not wish to limit ourselves to the precise details of structure shown, but desire to avail ourselves of such variations and modifications as may come within the scope of the appended claims.

What we claim as new is:

1. A duster of the class described, comprising: a container having a pair of separated compartments, one of said compartments being adapted for the reception of powdered material; a trough communicable with said powder-receiving compartment and adapted for receiving powder therefrom; an outlet conduit communicating with said trough; means for dividing the other of said compartments into a pair of non-communicating chambers; means for alternately drawing air into said chambers and alternately expelling the same therefrom; means for conducting the air expelled from said chambers into said trough for blowing powder therein toward and outwardly through said outlet conduit; means for agitating said material during the delivery of air into said trough; and adjustable means for regulating the quantity of material delivered into said trough.

2. A duster of the class described, comprising: a container having a pair of separated compartments, one of said compartments being adapted for the reception of powdered material; a trough communicable with said powder-receiving compartment and adapted for receiving powder therefrom; an outlet conduit communicating with one end of said trough; means for dividing the other of said compartments into a pair of non-communicating chambers; means for alternately drawing air into each of said chambers and alternately expelling same therefrom; means for conducting into said trough, at the opposite end thereof, the air expelled from said chambers for blowing powder in said trough toward and outwardly through said outlet conduit; means exterior of said container for operating said air drawing means; an agitator in said powder-receiving compartment for agitating powder therein; means for actuating said agitating means operable by said operating means; and an agitator in said trough operable by said operating means.

3. A duster of the class described, comprising: a container having a pair of separated compartments, one of said compartments being adapted for the reception of powdered material; a trough communicable with said powder-receiving compartment and adapted for receiving powder therefrom; an outlet conduit communicating with one end of said trough; means for dividing the other of said compartments into a pair of non-communicating chambers; means for alternately drawing air into each of said chambers and alternately expelling same therefrom; means for conducting into said trough, at the opposite end thereof, the air expelled from said chambers for blowing powder in said trough toward and outwardly through said outlet conduit; means exterior of said container for operating said air drawing means; an agitator in said powder-receiving compartment for agitating powder therein; means for actuating said agitating means operable by said operating means; an agitator in said trough and operable by said operating means; and means accessible exteriorly of said container for regulating the amount of powder passing from said powder-receiving compartment into said trough.

4. A duster of the class described, comprising: a container having a pair of separated compartments, one of said compartments being adapted for the reception of powdered material; a trough communicable with said powder-receiving compartment; a dividing member dividing said trough from said powder-receiving compartment and having a plurality of perforations formed therein for the passage of powder therethrough from said compartment into said trough, said trough being non-communicating except through said perforations with said powder-receiving compartment; an outlet conduit communicating with one end of said trough; means for dividing the other of said compartments into a pair of non-communicating chambers; means for alternately drawing air into said chambers and alternately expelling the same therefrom; means for conducting the air expelled from said chambers into said trough at its opposite end for blowing powder therein toward and outwardly through said outlet conduit; means accessible exterior of said container for operating said air drawing means; and means actuated by said operating means for agitating the powder in said trough.

VINCENT SANTARELLI.
JOHN GIACOBBE.